(12) United States Patent
Jee et al.

(10) Patent No.: US 12,198,362 B2
(45) Date of Patent: Jan. 14, 2025

(54) METHOD AND APPARATUS WITH IMAGE PROCESSING

(71) Applicants: SAMSUNG ELECTRONICS CO., LTD., Suwon-si (KR); Industry-Academic Cooperation Foundation, Yonsei University, Seoul (KR)

(72) Inventors: Seunghoon Jee, Seoul (KR); Moon Gi Kang, Seoul (KR); Sangyoon Lee, Seoul (KR); Minsub Kim, Seoul (KR); Soonyoung Hong, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 383 days.

(21) Appl. No.: 17/572,908

(22) Filed: Jan. 11, 2022

(65) Prior Publication Data

US 2023/0029073 A1 Jan. 26, 2023

(30) Foreign Application Priority Data

Jul. 9, 2021 (KR) ........................ 10-2021-0090264

(51) Int. Cl.
*G06T 7/55* (2017.01)
*G01S 17/894* (2020.01)
(Continued)

(52) U.S. Cl.
CPC .............. *G06T 7/55* (2017.01); *G01S 17/894* (2020.01); *G06T 5/50* (2013.01); *G06T 5/70* (2024.01);
(Continued)

(58) Field of Classification Search
CPC .. G06T 7/55; G06T 7/521; G06T 5/70; G06T 5/50; G06T 2207/10028; G06T 2207/10048; G01S 17/894
See application file for complete search history.

(56) References Cited

U.S. PATENT DOCUMENTS 8,441,697 B2 * 5/2013 Fletcher ............. H04N 1/00031
358/1.9
8,798,389 B2 * 8/2014 Hatakeyama ............. G06T 5/20
382/260
(Continued)

FOREIGN PATENT DOCUMENTS

KR 10-2015-0037366 A 4/2015
KR 10-1669819 B1 10/2016
(Continued)

OTHER PUBLICATIONS

Georgiev et al., "Time-of-Flight Range Measurement in Low-Sensing Environment: Noise Analysis and Complex-Domain Non-Local Denoising," IEEE Transactions on Image Processing, vol. 27, No. 6, Jun. 2018 (16 pages).
(Continued)

*Primary Examiner* — Gregory M Desire
(74) *Attorney, Agent, or Firm* — NSIP Law

(57) ABSTRACT

A method and apparatus with image processing are disclosed. The method includes determining a real part image, an imaginary part image, and an offset image based on input images that are dependent on infrared rays of different phases, removing noise from each of the real part image and the imaginary part image using the offset image as a noise removal guide, and generating a depth image based on an improved real part image and an improved imaginary part image corresponding to respective results of the removing.

30 Claims, 9 Drawing Sheets

(51) Int. Cl.
    *G06T 5/00*           (2024.01)
    *G06T 5/50*           (2006.01)
    *G06T 5/70*           (2024.01)
    *G06T 7/521*         (2017.01)

(52) U.S. Cl.
    CPC .... *G06T 7/521* (2017.01); *G06T 2207/10028* (2013.01); *G06T 2207/10048* (2013.01)

(56) References Cited

U.S. PATENT DOCUMENTS

| | | | |
|---|---|---|---|
| 10,003,757 | B2 | 6/2018 | Georgiev et al. |
| 10,242,294 | B2 * | 3/2019 | Eldar ..................... G06T 7/187 |
| 10,791,323 | B2 * | 9/2020 | Wuolijoki ............ H04N 13/383 |
| 11,520,052 | B2 * | 12/2022 | Ortiz Egea ............. G01S 17/36 |
| 11,528,416 | B2 * | 12/2022 | Jang ......................... G02B 7/40 |
| 2018/0067197 | A1 | 3/2018 | Schockaert et al. |
| 2020/0096637 | A1 | 3/2020 | Ulrich et al. |

FOREIGN PATENT DOCUMENTS

| | | |
|---|---|---|
| KR | 10-1828802 B1 | 2/2018 |
| KR | 10-1896301 B1 | 9/2018 |
| KR | 10-1896307 B1 | 9/2018 |
| KR | 10-2016-0071390 A | 3/2021 |

OTHER PUBLICATIONS

Bindilatti et al., "A Nonlocal Poisson Denoising Algorithm Based on Stochastic Distances," IEEE Signal Processing Letters, vol. 20, No. 11, Nov. 2013 (4 pages).

Peyman Milanfar, "A tour of modern image filtering: New insights and methods, both practical and theoretical," IEEE Signal Processing Magazine, Jan. 2013 (23 pages).

* cited by examiner

METHOD AND APPARATUS WITH IMAGE PROCESSING

CROSS-REFERENCE TO RELATED APPLICATIONS

This application claims the benefit under 35 USC § 119(a) of Korean Patent Application No. 10-2021-0090264, filed on Jul. 9, 2021, in the Korean Intellectual Property Office, the entire disclosure of which is incorporated herein by reference for all purposes.

BACKGROUND

1. Field

The following description relates to a method and apparatus with image processing.

2. Description of Related Art

A time-of-flight (TOF) sensor may be used for measuring a distance between the sensor and a subject and generate a depth image based on the time it takes for infrared ray(s) emitted toward the subject to be reflected back and sensed by the sensor. A TOF technology may include a direct TOF (dTOF) approach that directly measures the time it takes for the infrared ray to be reflected back and sensed, while an indirect TOF (iTOF) approach obtains depth information by calculating a phase difference with respect to images obtained/captured by sensing reflected infrared light of infrared rays of different phases emitted toward the subject. Both approaches may provide the depth information of the subject in real time. The dTOF approach may be implemented with lower costs and provide higher resolution than the iTOF approach, while the iTOF approach may provide better reliability of the depth information for noise removal compared to the dTOF approach.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes determining a real part image, an imaginary part image, and an offset image based on input images, where the input images are dependent on infrared rays of different phases, removing noise from each of the real part image and the imaginary part image using the offset image as a noise removal guide, and generating a depth image based on an improved real part image and an improved imaginary part image corresponding to respective results of the removing.

The method may further include sensing the infrared rays and generating the input images using the sensed infrared rays.

The method may further include transmitting the infrared rays, where the sensing of the infrared rays may include sensing reflections of the transmitted infrared rays, and the generating of the input images may use the sensed reflections of the transmitted infrared rays.

The determining of the real part image, the imaginary part image, and the offset image may include determining the real part image based on a difference in a first image pair among the input images, determining the imaginary part image based on a difference in a second image pair among the input images different from the first image pair, and determining the offset image based on a sum of the input images.

The removing of the noise may include determining a weighted sum coefficient of a non-local mean (NLM) filter from the offset image, and determining the improved real part image and the improved imaginary part image by calculating a weighted sum for each of the real part image and the imaginary part image based on the weighted sum coefficient.

The determining of the weighted sum coefficient may include determining a weight of a central pixel of a first scan patch of the offset image based on a similarity between a first target patch of the offset image and the first scan patch of the offset image, and determining a first weighted sum coefficient of the central pixel of the first target patch based on the weight of the central pixel of the first scan patch.

The generating of the depth image may include determining a phase image based on the improved real part image and the improved imaginary part image, and generating the depth image by performing phase wrapping based on the phase image.

The removing of the noise may include generating a temporary filtering result by removing noise from the real part image using the offset image as the noise removal guide, determining a residual image corresponding to a difference between the temporary filtering result and the real part image, generating an improved residual image by removing noise from the residual image using the offset image as the noise removal guide, and determining the improved real part image by adding the temporary filtering result and the improved residual image.

The removing of the noise may include performing recursive twicing regularization including a plurality of noise removal stages of performing the noise removal based on the offset image.

As noise removal on the offset image is gradually performed through the noise removal stages, a different version of the improved offset image may be used in each of the noise removal stages.

The performing of the recursive twicing regularization may include determining a first improved real part image, a first improved imaginary part image, and a first improved offset image by performing twicing regularization on the real part image, the imaginary part image, and the offset image, respectively, based on the offset image in a first noise removal stage of the noise removal stages, and determining a second improved real part image, a second improved imaginary part image, and a second improved offset image by performing twicing regularization on the real part image, the imaginary part image, and the offset image, respectively, based on the improved first offset image in a second noise removal stage of the noise removal stages.

A final improved real part image and a final improved imaginary part image may be determined through a final noise removal stage of the noise removal stages, and the generating of the depth image may include generating the depth image based on the final improved real part image and the final improved imaginary part image.

In one general aspect, one or more embodiments include a non-transitory computer-readable storage medium storing instructions that, when executed by a processor, configure the processor to perform any one, any combination of two or more, or all operations or methods described herein.

In one general aspect, an apparatus includes a processor configured to determine a real part image, an imaginary part image, and an offset image based on input images, where the input images are dependent on infrared rays of different phases, remove noise from each of the real part image and the imaginary part image using the offset image as a noise removal guide, and generate a depth image based on an improved real part image and an improved imaginary part image corresponding to respective results of the removing.

The apparatus may further include a sensor configured to sense the infrared rays and generate the input images using the sensed infrared rays.

The sensor may be configured to transmit the infrared rays, sense reflections of the transmitted infrared rays, and generate the input images using the sensed reflections of the transmitted infrared rays.

The processor may be configured to determine the real part image based on a difference in a first image pair among the input images, determine the imaginary part image based on a difference in a second image pair among the input images different from the first image pair, and determine the offset image based on a sum of the input images.

The processor may be configured to determine a weighted sum coefficient of a non-local mean (NLM) filter from the offset image, and determine the improved real part image and the improved imaginary part image by a weighted sum for each of the real part image and the imaginary part image based on the weighted sum coefficient.

For the determining of the weighted sum coefficient, the processor may be configured to determine a weight of a central pixel of a first scan patch based on a similarity between a first target patch of the offset image and the first scan patch of the offset image, and determine a first weighted sum coefficient of the central pixel of the first target patch based on the weight of the central pixel of the first scan patch.

The processor may be configured to perform recursive twicing regularization including a plurality of noise removal stages of performing the noise removal based on the offset image.

As noise removal on the offset image is gradually performed through the noise removal stages, a different version of the improved offset image may be used in each of the noise removal stages.

The apparatus may further include a memory storing instructions, which when executed by the processor, configure the processor to perform the determination of the real part image, the imaginary part image, and the offset image, the removal of the noise from each of the real part image and the imaginary part image, and the generation of the depth image.

In one general aspect, an electronic apparatus includes a time-of-flight (TOF) sensor configured to generate input images using infrared rays of different phases, and a processor configured to determine a real part image, an imaginary part image, and an offset image based on the input images, remove noise from each of the real part image and the imaginary part image using the offset image as a noise removal guide, and generate a depth image based on an improved real part image and an improved imaginary part image corresponding to respective results of the removing.

The apparatus may be configured to transmit the infrared rays of the different phases.

For the transmission of the infrared rays of the different phases, the time-of-flight (TOF) sensor may be configured to perform the transmission of the infrared rays of the different phases.

The processor may be configured to perform recursive twicing regularization including a plurality of noise removal stages of performing the noise removal based on the offset image.

As noise removal on the offset image is gradually performed through the noise removal stages, a different version of the improved offset image may be used in each of the noise removal stages.

In one general aspect, an electronic apparatus includes a sensor configured to capture image data, for plural input images, using infrared rays of different phases, and a processor configured to determine a real part image data and an imaginary part image data based on the captured image data for the plural input images, remove noise from each of the real part image data and the imaginary part image data using another image data as a noise removal guide, and generate depth image data based on an improved real part image data and an improved imaginary part image data corresponding to respective results of the removing, where the other image data is dependent on image data corresponding to multiple input images among the plural input images.

The other image data is an average of four of the plural input images, representing an offset image.

The processor may be further configured to perform recursive twicing regularization including a plurality of noise removal stages of performing the noise removal based on the other image data.

Other features and aspects will be apparent from the following detailed description, the drawings, and the claims.

Figure 1:
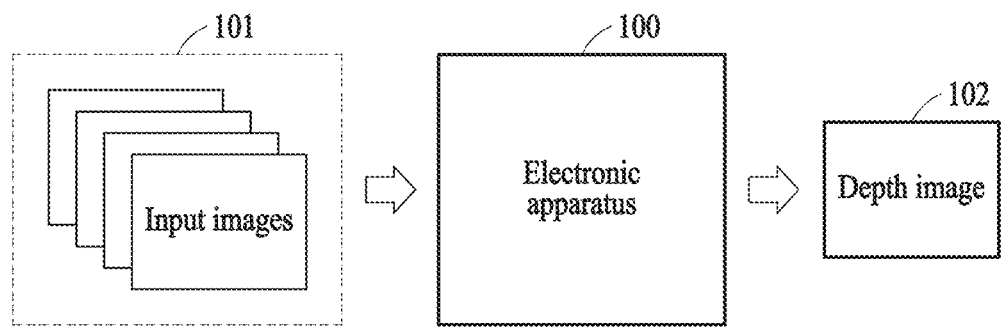
FIG. 1 illustrates an example operation of an electronic apparatus with image processing, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto FIG. 1 illustrates an example operation of an electronic apparatus with image processing, according to one or more embodiments. Referring to FIG. 1, an electronic apparatus 100 may generate a depth image 102 based on input images 101.

The input images 101 may be captured by a time-of-flight (TOF) sensor, e.g., with the electronic apparatus being representative of including the TOF sensor, as well as one or more processors configured to perform image processing dependent on the input images 101 and to generate the depth image 102. The input images 101 may be respective images of captured infrared rays of different phases. For example, a first input image 101 may be captured by the TOF sensor based on receipt of first infrared rays with a phase modulation of 0 degrees)(°, a second input image 101 may be captured by the TOF sensor based on receipt of second infrared rays with a phase modulation of 90°, a third input image 101 may be captured by the TOF sensor based on receipt of third infrared rays with a phase modulation of 180°, and a fourth input image 101 may be captured by the TOF sensor based on receipt of fourth infrared rays with a phase modulation of 270°, as non-limiting examples. Thus, each of the input images 101 may be classified based on their respective reference phases of their respective infrared rays. For example, the first input image 101 obtained by the example phase modulation of 0° may be classified as $Q_1$, the second input image 101 obtained by the example phase modulation of 90° may be classified as $Q_2$, the third input image 101 obtained by the example phase modulation of 180° may be classified as $Q_3$, and the fourth input image obtained by the example phase modulation of 270° may be classified as $Q_4$.

The electronic apparatus 100 may determine a real part image, an imaginary part image, and a phase image, for example, based on the input images 101 and the electronic apparatus 100 may generate the depth image 102 based on the phase image. An indirect TOF (iTOF) method for measuring depth information using a phase difference may obtain depth information of high resolution at low cost. However, the accuracy may be lowered or less than optimum in such a process of calculating a phase difference using a plurality of images. Rather, electronic apparatus 100 may obtain reliable depth information, e.g., without such a lowering of the accuracy, by removing noise from an image associated with the depth image 102.

Figure 2:
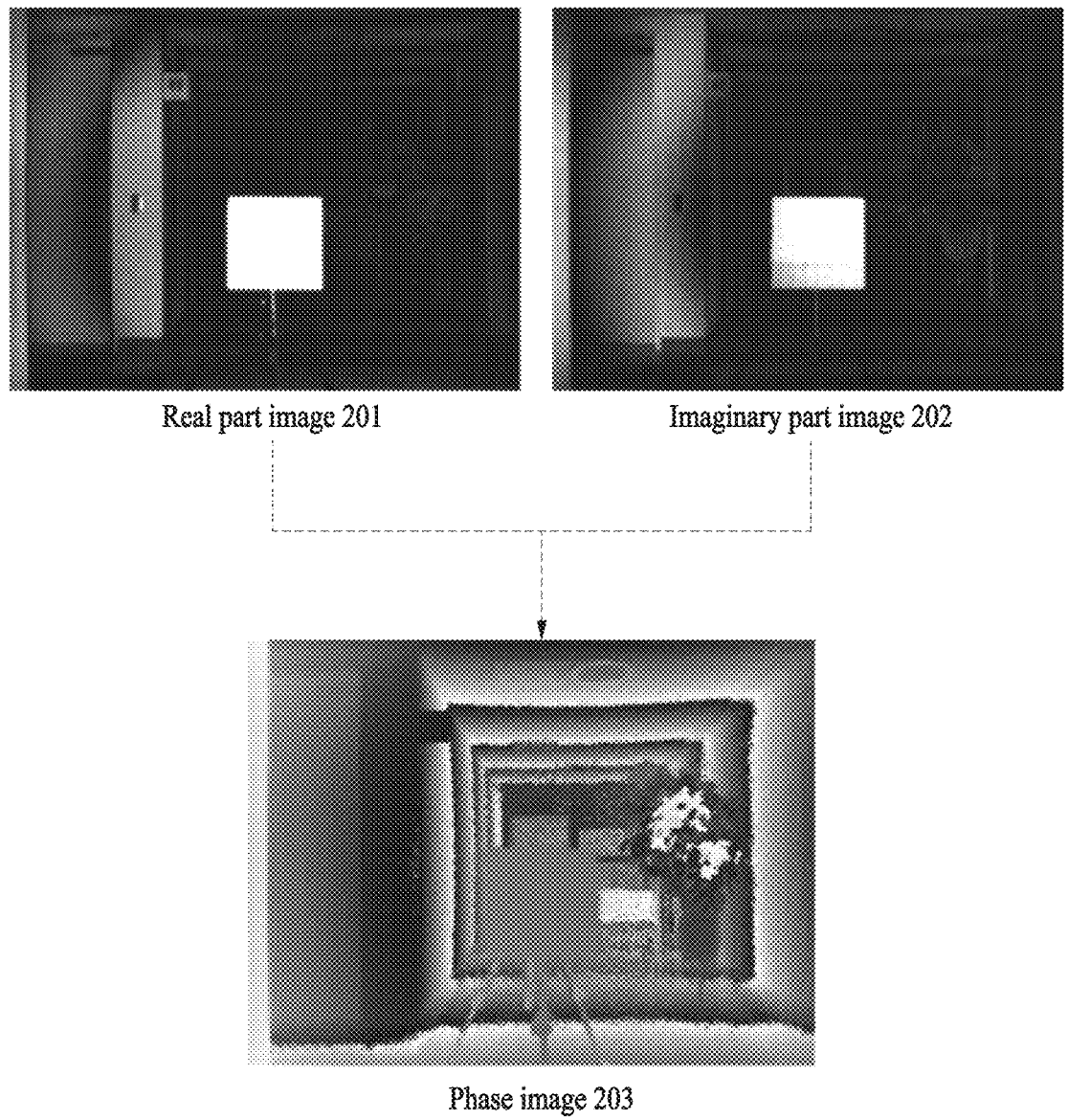
FIG. 2 illustrates an example real part image, an example imaginary part image, and an example phase image, according to one or more embodiments.

FIG. 2 illustrates an example real part image, an example imaginary part image, and an example phase image, according to one or more embodiments. Referring to FIG. 2, a phase image 203 may be generated based on a real part image 201 and an imaginary part image 202, for example. The real part image 201, the imaginary part image 202, and the phase image 203 may be determined by Equations 1 through 3 below, for example.

$$\alpha = \frac{1}{2}(Q_1 - Q_3) \qquad \text{Equation 1}$$

$$\beta = \frac{1}{2}(Q_2 - Q_4) \qquad \text{Equation 2}$$

$$\phi = \arctan\frac{\beta}{\alpha} \qquad \text{Equation 3}$$

Here, α denotes the real part image 201, β denotes the imaginary part image 202, and ϕ denotes the phase image 203. $Q_1$ through $Q_4$ denote input images based on infrared rays of the example different phases. For example, $Q_1$ may correspond to 0°, $Q_2$ may correspond to 90°, $Q_3$ may correspond to 180°, and $Q_4$ may correspond to 270° when using phases of 0°, 90°, 180°, and 270° as the non-limiting example different phases of the respective captured infrared rays, e.g., by the aforementioned TOF sensor. For ease of explanation, the input images $Q_1$ and $Q_3$ may be considered a first image pair, and the input images $Q_2$ and $Q_4$ may be considered a second image pair. In this example, the real part image 201 may be determined based on a difference in the first image pair, and the imaginary part image 202 may be determined based on a difference in the second image pair.

Phase wrapping, in which phase information is reset for every preset period (e.g., $2\pi$), may occur in the phase image 203, and thus a streak of the phase image 203 may occur. Although a statistical noise characteristic may be analyzed to effectively remove most noise, the streak may not be suitable or may not be desirable for analyzing a distribution characteristic.

Figure 3:
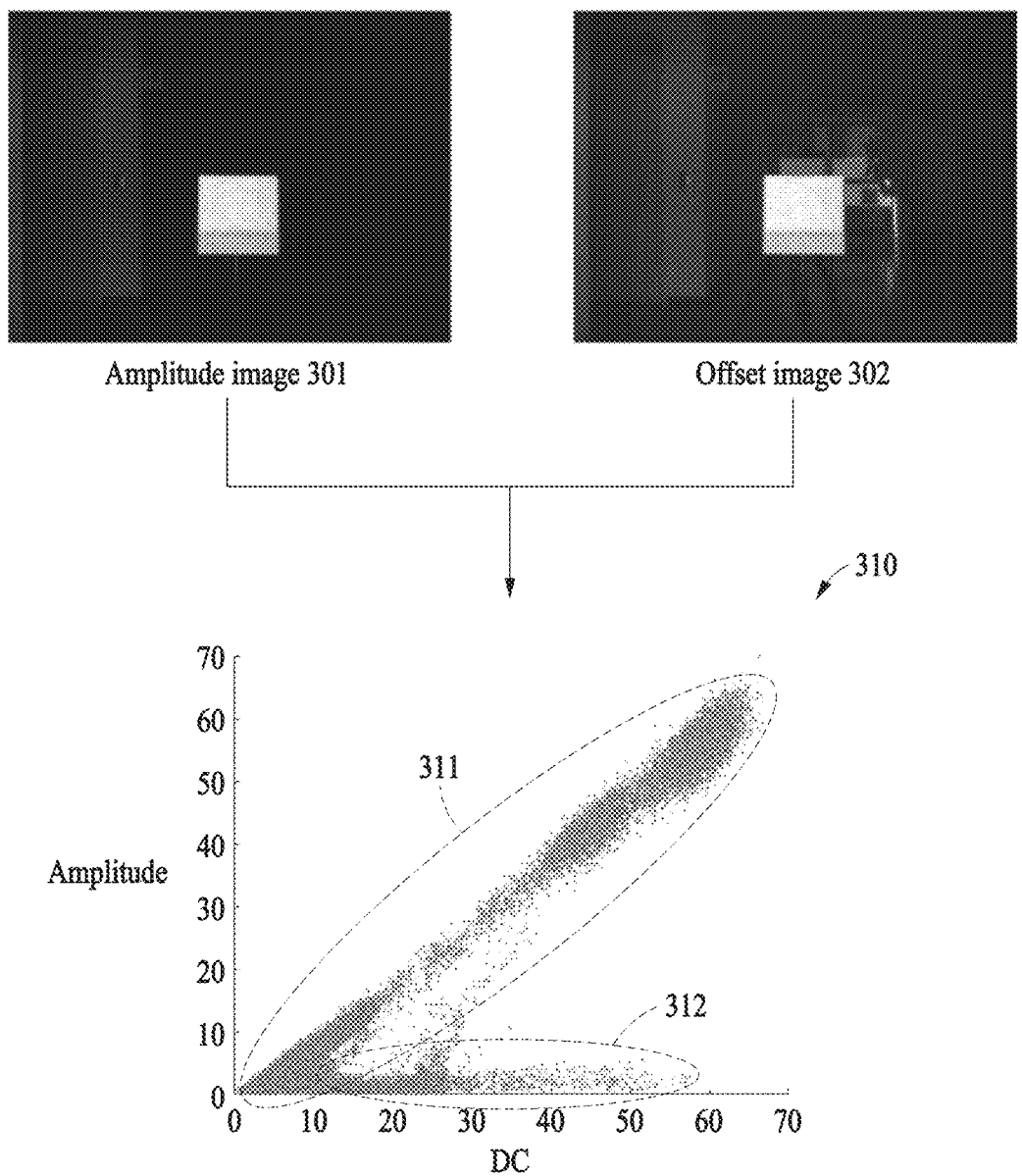
FIG. 3 illustrates an example amplitude image and an example offset image, according to one or more embodiments.

FIG. 3 illustrates an example amplitude image and an example offset image, according to one or more embodiments. Referring to FIG. 3, an amplitude image 301 and an offset image 302 may be generated based on a real part image and an imaginary part image. Example equations 4 and 5 below may be used to generate the amplitude image 301 and the offset image 302.

$$A = \sqrt{\alpha^2 + \beta^2} \quad \text{Equation 4}$$

$$I = \frac{1}{4}(Q_1 + Q_2 + Q_3 + Q_4) \quad \text{Equation 5}$$

Here, A denotes the amplitude image 301, and I denotes the offset image 302. The offset image 302 may correspond to an average of input images, for example.

The real part image, the imaginary part image, the amplitude image 301, and the offset image 302 may each include degradation by noise. However, the amplitude image 301 and the offset image 302 may each have a higher signal-to-noise ratio (SNR), e.g., compared to respective SNRs of the real part image and the imaginary part image, because the amplitude image 301 and the offset image 302 may respectively be dependent on the real part image and the imaginary part image, e.g., dependent on a sum of the real part image and the imaginary part image. Thus, an analyzed noise characteristic derived from the amplitude image 301 and/or the offset image 302 may be effectively applied for removing noise from the real part image and/or the imaginary part image.

For example, a graph 310 of FIG. 3 may represent a ratio of pixel values of the amplitude image 301 and the offset image 302. A vertical axis may correspond to a pixel value of the amplitude image 301 and may be referred to as the amplitude axis, and a horizontal axis may correspond to a pixel value of the offset image 302 and may be referred to as the DC axis. Referring to the graph 310, a pixel value distribution of the amplitude image 301 compared to the offset image 302 is mostly matched in the form of y=x as shown in a region 311, which indicates a high correlation between the amplitude image 301 and the offset image 302.

However, region 312 of the graph 310 may represent portions of the amplitude image 301 that may have a pixel value lower than corresponding pixels of the offset image 302. As a distance between a sensor and an object increases, a pixel value corresponding to the object may decrease, and a corresponding pixel value may further decrease when calculating the real part image and the imaginary part image.

Thus, a pixel value corresponding to the amplitude image 301 may also decrease. The offset image 302 may be based on a sum of all input images, and a signal thereof may have more energy and a greater pixel value than other images including, for example, the amplitude image 301 which may be dependent on the summation of the squares of the real part image and the imaginary part image. That is, the offset image 302 may have a higher SNR than each of the real part image, the imaginary part image, and the amplitude image 301. In an example, the electronic apparatus may remove noise using the offset image 302 as a guide, thereby improving noise removal performance.

Figure 4:
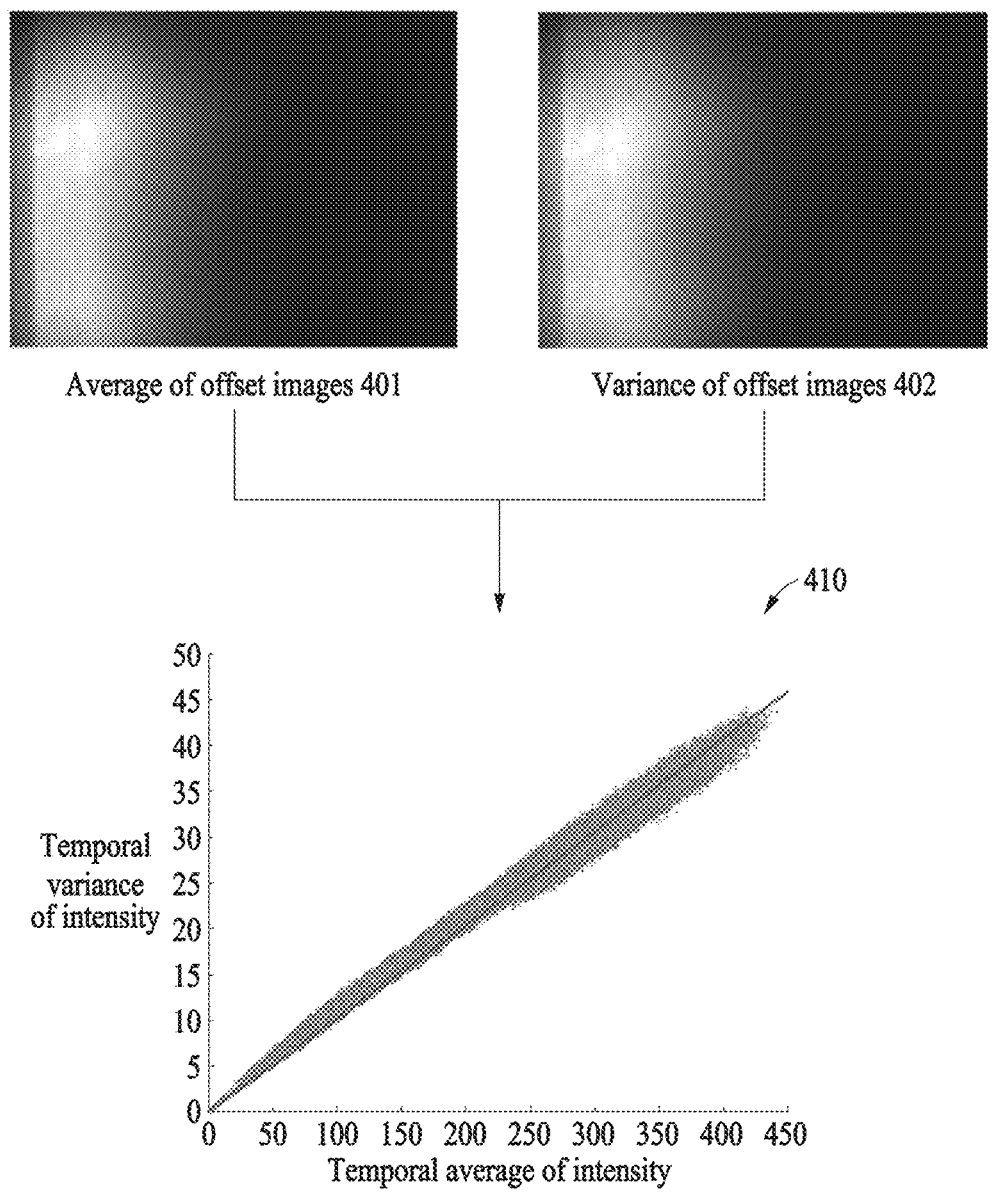
FIG. 4 illustrates an example of a distribution characteristic of offset images, according to one or more embodiments.

FIG. 4 illustrates an example of a distribution characteristic of offset images, according to one or more embodiments. Referring to FIG. 4, an image 401 may represent an average (e.g., temporal average) of sample offset images, and an image 402 may represent a variance (e.g., temporal variance) of the sample offset images. In a state in which there is no movement, a plurality of sample offset images (e.g., 400 images) having the same pixel values of all amplitudes may be captured. The image 401 may be determined based on the determined average of pixels of the sample offset images, and the image 402 may be determined based on a determined variance of the pixels.

For example a graph 410 of FIG. 4 may represent a relationship between the average and the variance of the sample offset images. A noise standard deviation may be greater in an area having a greater amplitude when using the sample offset images having depths and amplitudes that are uniformly distributed without a strong edge, for example. In this example, the graph 410 may represent an amplitude average distribution and a noise variance distribution. The graph 410 may exhibit characteristics of a Poisson distribution in which a noise variance is proportional to an amplitude value. This may be expressed by Equation 6 below, for example.

$$I = \bar{I} + \eta(\bar{I})\delta \quad \text{Equation 6:}$$

Here, I denotes a sample offset image with noise, $\bar{I}$ denotes a sample offset image with the noise removed, $\eta(\bar{I})$ denotes a standard deviation of the noise, and $\delta$ denotes a Gaussian noise with an average of 0 and a standard deviation of 1. When using a plurality of sample offset images (e.g., 400 images), the electronic apparatus may estimate that an average image has almost no noise. Thus, $\bar{I}$ may correspond to the average image.

The noise variance may be proportional to an amplitude value as expressed by Equation 7 below, for example.

$$\eta^2(\bar{I}) = a\bar{I} \quad \text{Equation 7:}$$

In Equation 7, a denotes a slope.

In an example, an electronic apparatus may perform noise removal using a non-local mean (NLM) filter. As a non-limiting example, a structure of the NLM filter may be expressed by Equations 8 and 9 below.

$$\hat{I}_i = \sum_{j \in N_i} \frac{1}{W_i} w_{ij} I_j \quad \text{Equation 8}$$

$$W_i = \sum_{j \in N_i} w_{ij} \quad \text{Equation 9}$$

Here, $\hat{I}$ denotes an offset image from which noise is removed, $N_i$ denotes a neighborhood window centered at i, and i, j denotes a pixel position. I denotes a noisy input offset image (e.g., an initial offset image), $w_{ij}$ denotes a weighted sum coefficient of a position j in a central window of a position i, and $W_i$ denotes a normalization coefficient.

A noise removal performance by the electronic apparatus may depend on a design of the weighted sum coefficient $w_{ij}$. For example, a noise characteristic of an offset image may be defined based on a Poisson noise characteristic, and such a noise characteristic of the offset image may be reflected in the design of $w_{ij}$. A stochastic distance corresponding to a Poisson distribution may be used to calculate a distance between NLM patches, and a relationship between an amplitude value and a noise intensity analyzed as represented by the graph 410 may be applied to a noise removal intensity. Thus, the noise removal performance by the electronic apparatus may be maximized.

In an example, the weighted sum coefficient $w_{ij}$ may be defined as expressed by Equation 10 below, for example.

$$w_{ij} = \exp\left(-\frac{\sum_{k \in \chi} d_\psi(I_{i+k}, I_{j+k})}{\gamma \cdot \sigma_{\eta_i}}\right) \quad \text{Equation 10}$$

In Equation 10, a stochastic distance dip may correspond to a Kullback-Leibler distribution and may be expressed by Equation 11. $\chi$ denotes an aggregate position of pixels in a surrounding area of i, j coordinates, $\sigma_{\eta_i}$ denotes a noise standard deviation, and $\gamma$ denotes a value that may be adjusted with a noise removal constant.

$$d_\psi(I_i, I_j) = \frac{1}{2}\left[(I_i - I_j) \cdot \ln\left(\frac{I_i}{I_j}\right)\right] \quad \text{Equation 11}$$

Here, $d\psi$ may correct a distance value in a Poisson noise by adding a ratio component to a difference between the two values. $\sigma_{\eta_i}$ may be expressed by Equation 12 below.

$$\sigma_{\eta_i} = a \cdot \hat{\lambda}_{ML}(I_i) \quad \text{Equation 12:}$$

Here, $\hat{\lambda}_{ML}$ may be expressed by the example Equation 13 below, and a may represent a slope.

$$\hat{\lambda}_{ML}(I_i) = \frac{1}{n}\sum_{k \in \chi} I_{i+k} \quad \text{Equation 13}$$

Figure 5:
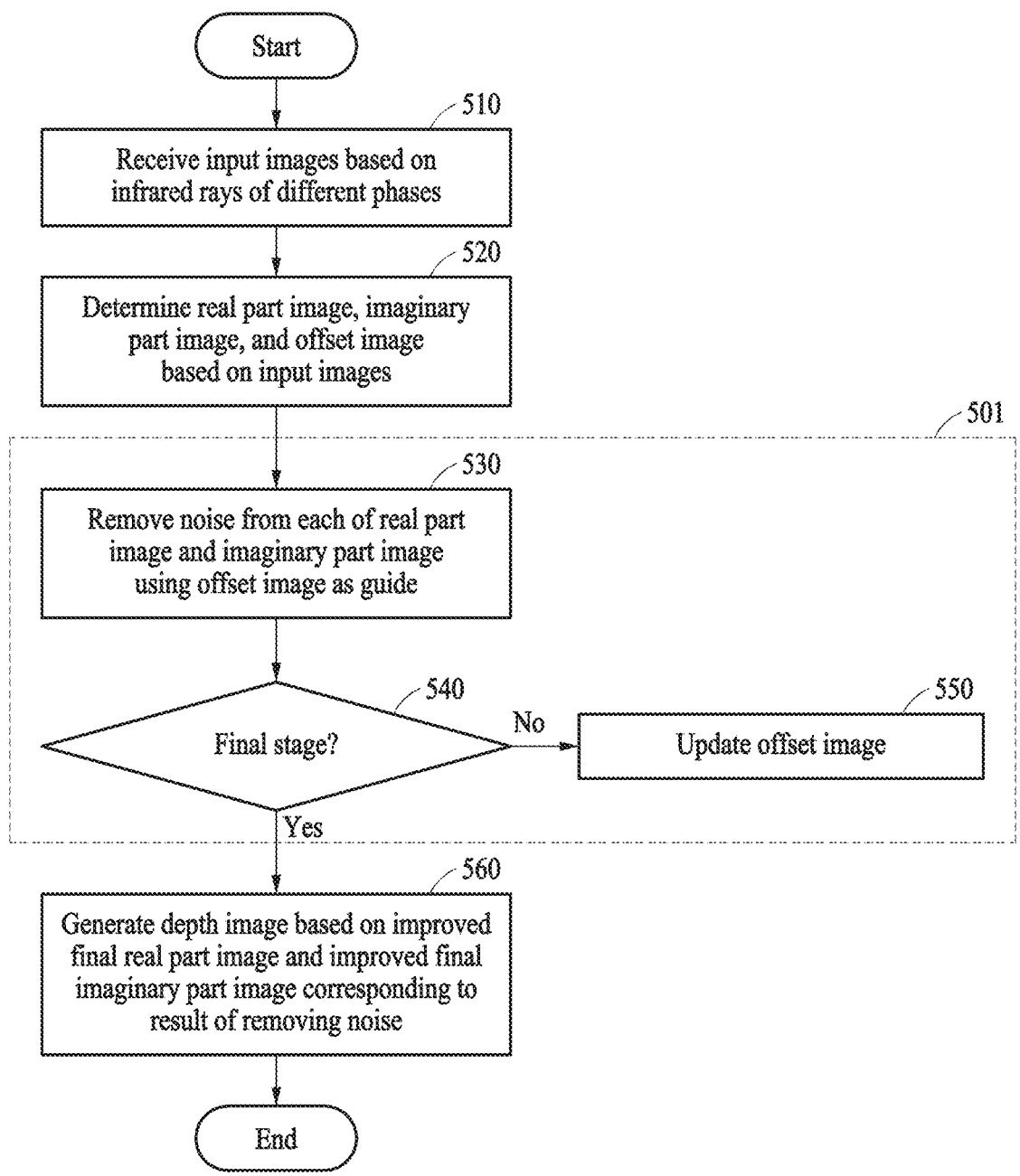
FIG. 5 illustrates an example of noise removal-based image processing, according to one or more embodiments.

FIG. 5 illustrates an example of noise removal-based image processing, according to one or more embodiments. Referring to FIG. 5, in operation 510, an electronic apparatus may receive input images that are based on infrared images of different phases. The input images may be generated by a TOF sensor and transmitted to a processor of the electronic apparatus. The input images may be generated through infrared rays of reference phases including 0°, 90°, 180°, and 270°, as non-limiting examples.

In operation 520, the electronic apparatus may determine a real part image, an imaginary part image, and an offset image based on the input images. The electronic apparatus may determine the real part image based on a difference in a first image pair among the input images, the imaginary part image based on a difference in a second image pair among the input images, and the offset image based on a sum of the input images, for example.

In operation 530, the electronic apparatus may remove noise from each of the real part image and the imaginary part image using the offset image as a guide for the noise in the real part image and the imaginary part image. In an example, the electronic apparatus may perform such a noise removal using an NLM filter. The electronic apparatus may determine a weighted sum coefficient of the NLM filter from the offset image and calculate a weighted sum for each of the real part image and the imaginary part image based on the weighted sum coefficient.

The electronic apparatus may define a target patch and a scan patch of a preset size in the offset image and determine a weight of a central pixel of the scan patch based on a determined similarity between the target patch and the scan patch. The electronic apparatus may determine a weighted sum coefficient of the center pixel of the target patch based on the weight of the center pixel of the scan patch associated with the target patch.

The electronic apparatus may determine the weight by changing the target patch and the scan patch. For example, the electronic apparatus may determine scan patches for a target patch while sliding a window in/across the offset image, and calculate a similarity between the target patch and each of the scan patches. The electronic apparatus may determine a weighted sum coefficient of a central pixel of the target patch based on each calculated similarity. The electronic apparatus may calculate a similarity and a weighted sum coefficient for remaining target patches in a similar manner as described above.

The electronic apparatus may apply a weighted sum coefficient derived from a guide image (e.g., offset image) to a filter input image (e.g., real part image and imaginary part image). The electronic apparatus may remove noise of a target image by calculating a weighted average between patches based on a weight of each pixel of the filter input image.

In an example, the electronic apparatus may remove noise from the filter input image through twicing regularization. Twicing regularization may be a method of obtaining a final filtering result by obtaining a residual image corresponding to a difference between a temporary filtering result of the filter input image and the filter input image and adding, to the temporary filtering result, a result of additionally applying a filter of the same coefficient to the residual image. Twicing regularization may be expressed by Equation 14 below, for example.

$$\hat{I}_2 + \hat{I} + \text{GNR}(I - \hat{I}, I), \hat{I} = \text{GNR}(I, I) \quad \text{Equation 14:}$$

Here, $\hat{I}_2$ denotes a final filtering result, $\hat{I}$ denotes a temporary filtering result, and I denotes a filter input image. Equation 14 may represent twicing regularization in a case in which both the filter input image and the guide image are offset images. However, it may also be applied when the filter input image is a real part image or an imaginary part image. A grain-noise reduction (GNR) (T, G) filter may refer to a filter that removes noise from a filter input image T using a guide image G. Twicing normalization may be used to achieve both purposes of noise removal and definition maintenance by supplementing a high frequency component that may be lost when noise removal is performed by the electronic apparatus, using a residual image.

For example, the electronic apparatus may generate a temporary filtering result by removing noise from a real part image using an offset image as a guide, and determine a residual image corresponding to a difference between the temporary filtering result and the real part image. The electronic apparatus may generate an improved residual image by removing noise from the residual image using the offset image as the guide and determine an improved real part image by adding the temporary filtering result and the improved residual image. The electronic apparatus may determine an improved imaginary part image by performing twicing regularization based on the offset image and the imaginary part image.

In an example, the electronic apparatus may perform recursive twicing regularization. The recursive twicing regularization may include a plurality of noise removal stages in which noise removal of the real part image and/or the imaginary part image is performed based on an offset image. Operations of a block 501 may correspond to such recursive twicing regularization.

In the recursive twicing regularization, a filter input image may include a real part image, an imaginary part image, and an offset image, and these images may be repeatedly improved by respective noise removals until a final stage of noise removal is completed. Thus, noise removal may be gradually performed on the offset image through the noise removal stages, and different versions of the improved offset image may be used at the stages.

The recursive twicing regularization may be expressed by Equation 15 below, for example.

$$\hat{I}_k = \tilde{I}_k + GNR(\widehat{I_{k-1}} - \tilde{I}_k, \widehat{I_{k-1}}),$$
$$\tilde{I}_k = GNR(\widehat{I_{k-1}}, \widehat{I_{k-1}})$$

Equation 15

Here, $\hat{I}_k$ denotes a final filtering result at a Kth stage, $\tilde{I}_k$ denotes a temporary filtering result at the Kth stage, and $\widehat{I_{k-1}}$ denotes a final filtering result at a K−1th stage. $\widehat{I_{k-1}}$ may correspond to a filter input image at the Kth stage.

Equation 15 may represent recursive twicing regularization in a case in which both the filter input image and the guide image are offset images. However, it may also be applied when the filter input image is the guide image, the real part image, and the imaginary part image. This may be expressed by the below example Equations 16 through 21.

Equations 16 and 17 below may represent example recursive twicing regularization for an offset image.

$$\hat{I}_k = \tilde{I}_k + GNR(R_{k-1}', \widehat{I_{k-1}})$$

Equation 16:

In Equation 16, $R_{k-1}'$ denotes a residual image corresponding to a difference between a temporary filtering result $\tilde{I}_k$ at a Kth stage and a final filtering result $\widehat{I_{k-1}}$ at a K−1th stage. $R_{k-1}'$ may be expressed by Equation 17 below, for example.

$$R_{k-1}' = \widehat{I_{k-1}} - GNR(\widehat{I_{k-1}}, \widehat{I_{k-1}})$$

Equation 17:

According to Equation 17, a temporary filtering result $\tilde{I}_k$ may be determined by removing noise from a filter input image $\widehat{I_{k-1}}$ using an offset image $\widehat{I_{k-1}}$ as a guide, and a residual image $R_{k-1}'$ corresponding to a difference in the temporary filtering result $\tilde{I}_k$, and the filter input image $\widehat{I_{k-1}}$ may be determined. According to Equation 16, an improved residual image may be determined by removing noise from the residual image $R_{k-1}'$ using the offset image $\widehat{I_{k-1}}$ as the guide, and the final filtering result $\hat{I}_k$ may be determined through a sum of the temporary filtering result $\tilde{I}_k$ and the improved residual image.

Equations 18 and 19 below may represent example recursive twicing regularization for a real part image.

$$\widehat{\alpha_k} = \widetilde{\alpha_k} + GNR(R_{k-1}^\alpha, \widehat{I_{k-1}})$$

Equation 18:

$$R_{k-1}^\alpha = \widehat{\alpha_{k-1}} - GNR(\widehat{\alpha_{k-1}}, \widehat{I_{k-1}})$$

Equation 19:

Here, $\widehat{\alpha_k}$ denotes a final filtering result at a Kth stage, $\widetilde{\alpha_k}$ denotes a temporary filtering result at the Kth stage, and $\widehat{\alpha_{k-1}}$ denotes a final filtering result at a K−1th stage. $\widehat{\alpha_{k-1}}$ may correspond to the filter input image at the Kth stage.

According to Equation 19, a temporary filtering result $\widetilde{\alpha_k}$ may be determined by removing noise from a filter input image $\widehat{\alpha_{k-1}}$ using an offset image $\widehat{I_{k-1}}$ as a guide, and a residual image $R_{k-1}^\alpha$ corresponding to a difference between the temporary filtering result $\widetilde{\alpha_k}$ and the filter input image $\widehat{\alpha_{k-1}}$ may be determined. According to Equation 18, an improved residual image may be determined by removing noise from the residual image $R_{k-1}'$ using the offset image $\widehat{I_{k-1}}$ as the guide, and the final filtering result $\widehat{\alpha_k}$ may be determined through a sum of the temporary filtering result $\widetilde{\alpha_k}$ and the improved residual image.

Equations 20 and 21 below may represent example recursive twicing regularization for an imaginary part image.

$$\widehat{\beta_k} = \widetilde{\beta_k} + GNR(R_{k-1}^\beta, \widehat{I_{k-1}})$$

Equation 20:

$$R_{k-1}^\beta = \widehat{\beta_{k-1}} - GNR(\widehat{\beta_{k-1}}, \widehat{I_{k-1}})$$

Equation 21:

The electronic apparatus may perform noise removal based on Equations 18 through 21 in operation 530 of FIG. 5 and determine whether a current stage is a final stage in operation 540. For example, the final stage may be set based on the number of stages (or the number of repetitions), a threshold associated with a difference before and after the noise removal, and the like. When the current stage is not the final stage, the electronic apparatus may update the offset image based on Equations 16 and 17 in operation 550 and perform noise removal based on the updated offset image in operation 530.

For example, the electronic apparatus may determine a first improved real part image $\widehat{\alpha_k}$, a first improved imaginary part image $\widehat{\beta_k}$, and a first improved offset image $\hat{I}_k$ by performing twicing regularization on the real part image $\widehat{\alpha_{k-1}}$, the imaginary part image $\widehat{\beta_{k-1}}$, and the offset image $\widehat{I_{k-1}}$, respectively, based on the offset image $\widehat{I_{k-1}}$ in a Kth noise removal stage. The electronic apparatus may also determine a second improved real part image $\widehat{\alpha_{k+1}}$, a second improved imaginary part image $\widehat{\beta_{k+1}}$, and a second improved offset image $\widehat{I_{k+1}}$ by performing twicing regularization on the first improved real part image $\widehat{\alpha_k}$, the first improved imaginary part image $\widehat{\beta_k}$, and the first improved offset image $\hat{I}_k$, respectively, based on the offset image $\hat{I}_k$ in a K+1th noise removal stage.

As the stages of noise removal progress, noise of the real part image and the imaginary part image may be repeatedly removed, and an offset image repeatedly updated in such noise removal stages may be used.

When the current stage is the final stage, the electronic apparatus may generate a depth image based on the improved real part image and the improved imaginary part image. When a final improved real part image and a final improved imaginary part image are determined at the final noise removal stage (e.g., determined in operation 540), the electronic apparatus may generate a depth image based on the improved final real part image and the improved final imaginary part image. The electronic apparatus may determine a phase image based on the improved real part image and the improved imaginary part image and generate the depth image by performing phase wrapping based on the phase image.

The depth image may be generated by Equations 22 through 25 below, for example.

$$\hat{\alpha}_i = \sum_{j \in N_i} \frac{1}{W_i} w_{ij} \alpha_j \qquad \text{Equation 22}$$

$$\hat{\beta}_i = \sum_{j \in N_i} \frac{1}{W_i} w_{ij} \beta_j \qquad \text{Equation 23}$$

$$\hat{\phi} = \arctan \frac{\hat{\beta}}{\hat{\alpha}} \qquad \text{Equation 24}$$

$$\hat{D} = \frac{c}{2f} \cdot \frac{\hat{\phi}}{2\pi} \qquad \text{Equation 25}$$

Here, $\hat{\alpha}$, $\hat{\beta}$, and $\hat{\phi}$ may be a real part image, an imaginary part image, and a phase image, respectively, from which noise has been removed, that is, they may be the final improved real part image, the final improved imaginary part image, and the final improved phase image. $\hat{D}$ may be a depth image from which noise is removed, e.g., in which noise has not been introduced, and may be referred to as an improved depth image. f denotes a frequency of an infrared ray used as a light source.

Figure 6:
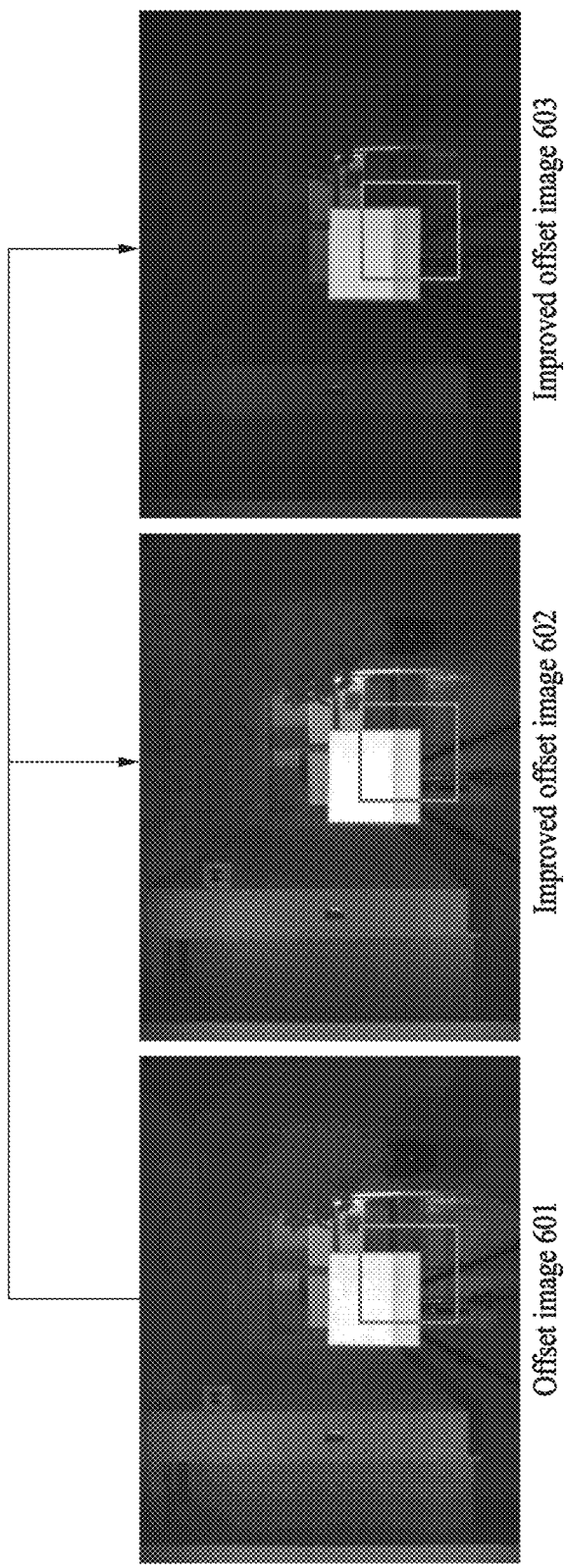
FIG. 6 illustrates an example offset image and example improved offset images, according to one or more embodiments.
Figure 7:
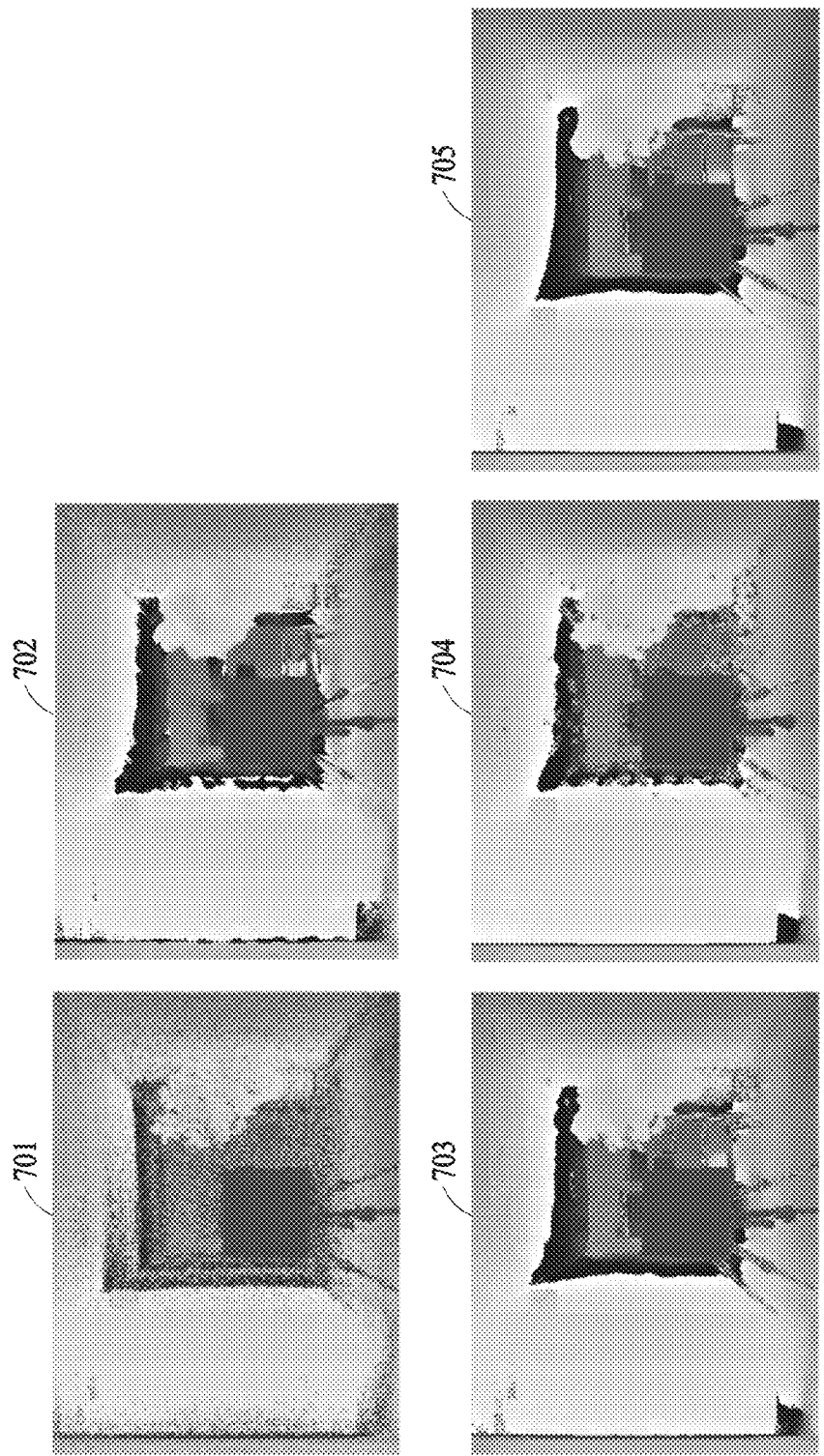
FIG. 7 illustrates examples of different filtering results, according to various embodiments.

FIG. 6 illustrates an example offset image and examples of improved offset images, according to one or more embodiments. An offset image 601 may be an initial unimproved offset image. An improved offset image 602 may be a version of an offset image improved without recursive twicing regularization, and an improved offset image 603 may be a version of an offset image improved through recursive twicing regularization. The improved offset image 603 may include less noise and may include sharp edges, and have objects shown vividly despite the objects being disposed a long distance from the sensor, e.g., the TOF sensor of the electronic apparatus. While discussions above have been presented with respect to the use of the offset image as the guide, such improvements of the real part image, imaginary part image, and phase image, as well as twice regularization(s), are also available using the amplitude image as the guide for noise removal, FIG. 7 illustrates examples of different filtering results, according to various embodiments. Referring to FIG. 7, there are an original depth image 701 that could be generated by original real and imaginary part images in which noise removal has not been performed, while depth images 702 and 704 are depth images respectively generated based on amplitude image-based noise removal having been applied according to one or more embodiments, e.g., where the above noise removal is performed using the amplitude image as the guide (in place of the offset image), and while depth images 703 and 705 are depth images respectively generated based on offset image-based noise removal having been applied according to one or more embodiments, e.g., where the above noise removal is performed using the offset image as the guide. The depth images 702 and 703 may be depth images resulting from the recursive twicing regularization having not been applied, while the depth images 704 and 705 may be depth images resulting from such application of the recursive twicing regularization. For example, the depth image 705 may provide relatively accurate depth information with high resolution.

Figure 8:
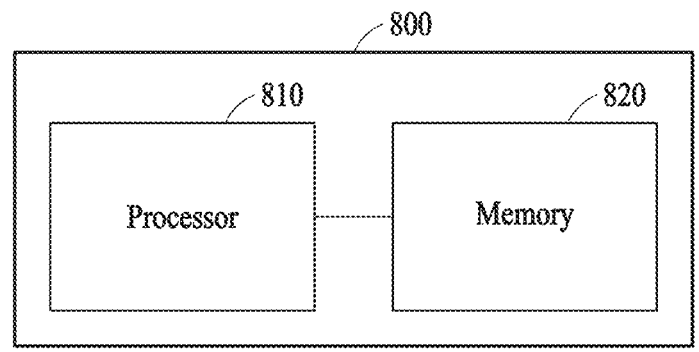
FIG. 8-10 illustrates examples electronic apparatuses, respectively according to one or more embodiments.

FIG. 8 illustrates an example electronic apparatus with image processing, according to one or more embodiments. Referring to FIG. 8, an electronic apparatus 800 includes a processor 810 and a memory 820. The memory 820 may be connected to the processor 810 and store instructions executable by the processor 810, store data to be processed by the processor 810, and/or store data processed by the processor 810. The memory 820 may include a non-transitory computer-readable medium, for example, a high-speed random-access memory (RAM) and/or nonvolatile computer-readable medium (e.g., at least one disk storage device, flash memory device, or another nonvolatile solid-state memory device). The electronic apparatus 800 may correspond to any or all electronic apparatuses described herein. The electronic apparatus 800 may also be an apparatus that can perform multiple functions in addition to such depth image generation with such lessened noise, and may alternatively be a hardware image processing module of such an electronic apparatus.

The processor 810 may execute instructions stored in the memory 820, for example, which when executed may configure the processor 810 to perform any one or any combination of two or more or all operations described herein with reference to FIGS. 1 through 10. For example, the processor 810 may receive input images based on infrared rays having different phases, determine a real part image, an imaginary part image, and an offset image based on the input images, remove noise from each of the real part image and the imaginary part image using the offset image as a guide, and generate a depth image based on an improved real part image and an improved imaginary part image corresponding to the result of the noise removal. For further detailed descriptions of the electronic apparatus 800, reference may be made to what is additionally described herein with reference to FIGS. 1 through 7 and 9-10, which are also applicable to the electronic apparatus 800.

Figure 9:
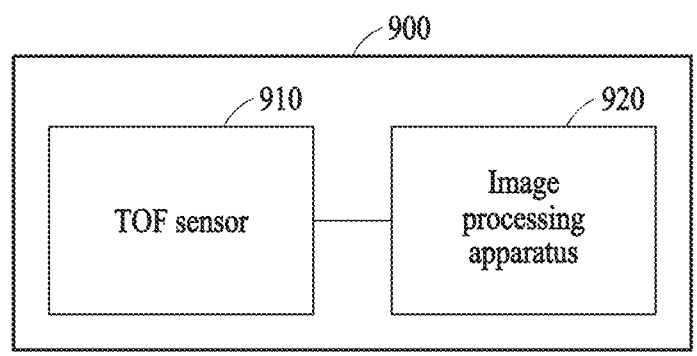
Figure 10:
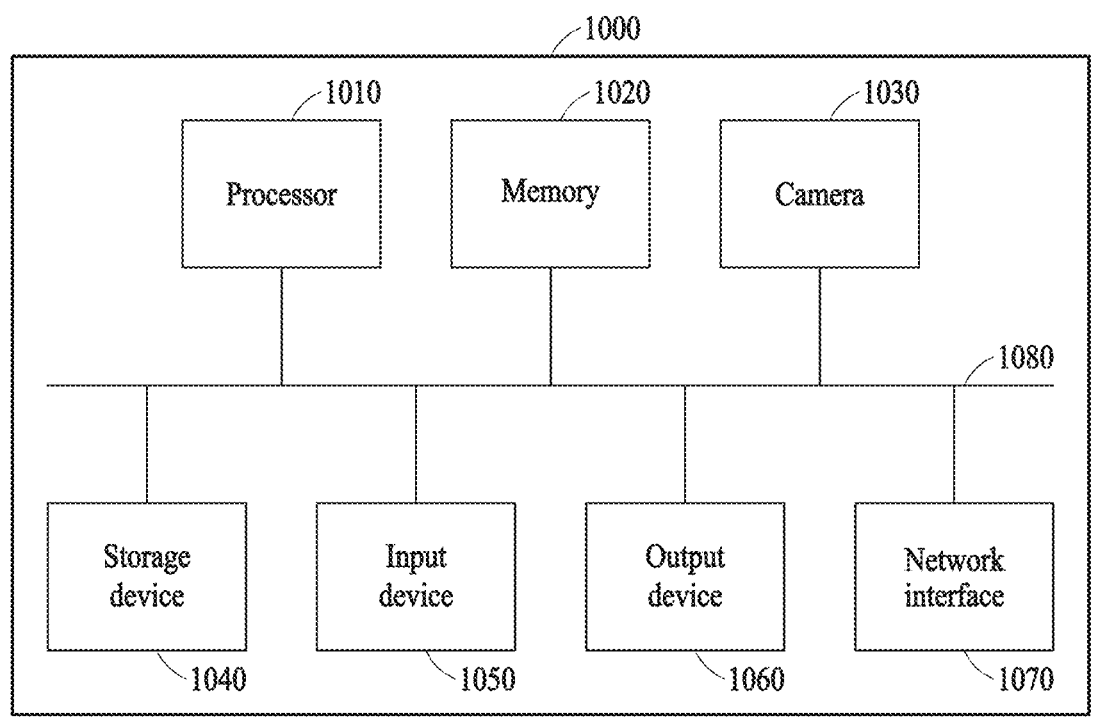

FIGS. 9 and 10 illustrate examples of an electronic apparatus, respectively according to one or more embodiments. Referring to FIG. 9, the electronic apparatus 900 includes a TOF sensor 910 and an image processing apparatus 920. The image processing apparatus 920 is representative of a processor and a memory. The TOF sensor 910 may be representative of including an infrared light source configured to transmit infrared rays of different phases and a sensor configured to respectively capture infrared images with the different phases. An infrared image may be provided to the image processing apparatus 920 as an input image, and the image processing apparatus 920 may generate a depth image based on the input image. For example, the processor of the image processing apparatus 920 may determine a real part image, an imaginary part image, and an offset image based on the input images, remove noise from each of the real part image and the imaginary part image using the offset image as a guide, and generate a depth image based on an improved real part image and an improved imaginary part image corresponding to a result of the removing. For further detailed descriptions of the electronic apparatus 900, reference may be made to what is additionally described herein with reference to FIGS. 1 through 8 and 10, which are also applicable to the electronic apparatus 900. The electronic apparatus 900 may correspond to any or all electronic apparatuses described herein. The electronic apparatus 800 may also be an apparatus that can perform multiple functions in addition to such depth image generation with such lessened noise, and may alternatively be a hardware TOF module of such an electronic apparatus, where the TOF module performs the transmission of the infrared rays with different frequencies, collects received reflections from the transmitted infrared rays, and generates the depth image with the lessened noise due to any one or more or all noise removal operations descried herein.

Referring to FIG. 10, an electronic apparatus 1000 includes a processor 1010, a memory 1020, a camera 1030, a storage device 1040, an input device 1050, an output device 1060, and a network interface 1070, and these components may communicate with one another through a communication bus 1080, as non-limiting examples. As a non-limiting example, the electronic apparatus 1000 may be, or may be implemented as at least a portion of, a mobile device such as a mobile phone, a smart phone, a personal digital assistant (PDA), a netbook, a tablet computer, a laptop computer, and the like, a wearable device such as a smart watch, a smart band, smart glasses, and the like, a home appliance such as a television (TV), a smart TV, a refrigerator, and the like, a security device such as a door lock and the like, and a vehicle such as an autonomous vehicle, a smart vehicle, and the like. The electronic apparatus 1000 may be any one or more or all of the electronic apparatuses described herein, e.g., the electronic apparatus 1000 may be the electronic apparatus 100 of FIG. 1, the electronic apparatus 800 of FIG. 8, and/or the electronic apparatus 900 of FIG. 9, as non-limiting examples.

The processor 1010 may execute instructions to control operations of the electronic apparatus 1000, as a non-limiting example. The processor 1010 may be configured to perform any one, any combination of two or more or all of the operations described herein with reference to FIGS. 1 through 10. For example, the processor 1010 may execute such instructions stored in the memory 1020 and/or the storage device 1040, which when executed by the processor 1010, configure the processor to perform any one, any combination of two or more or all of the operations described herein with reference to FIGS. 1 through 10. In an example, the memory 1020 may include a computer-readable storage medium or device. For example, the memory 1020 may store instructions executed by the processor 1010, and may further store related information while other software and/or applications are being executed by the electronic apparatus 1000. For example, the processor 1010 may execute such further instructions which control other operations of the electronic apparatus 1000, e.g., in addition to the image processing and/or the depth calculation operations, such as further operations that utilize the calculated depths and/or calculated depth image(s) and other operations of the electronic apparatus that do not involve the calculated depths and/or calculated depth image(s).

The camera 1030 may capture an image and/or video, and is representative of one or more cameras 1030. As a non-limiting example, the camera 1030 may include a TOF camera. The storage device 1040 may include a computer-readable storage medium or device. The storage device 1040 may store a greater amount of information than the memory 1020 and may store the information for a long period of time. As non-limiting examples, the storage device 1040 may include, for example, a magnetic hard disk, an optical disc, a flash memory, a floppy disk, or other types of nonvolatile memory.

As a non-limiting example, the input device 1050 may receive an input from a user using a keyboard and/or a mouse, as well as through use of a touch input, a voice input, and an image input, as non-limiting examples. The input device 1050 may include, for example, a keyboard, a mouse, a touch screen, a microphone, or any other device that detects an input from a user to the electronic apparatus 1000, as non-limiting examples. The output device 1060 may provide an output of the electronic apparatus 1000, e.g., to a user, through a visual, auditory, and/or tactile channel, or through other transmission channel. As non-limiting examples of the visual, auditory, and/or tactile channels, the output device 1060 may include, for example, a display, a touch screen, a speaker, a vibration generating device, or any other device that provides an output to a user. The network interface 1070 may communicate with an external device through a wired and/or wireless network.

The image processing apparatuses, the electronic apparatuses, image processing modules, devices, or apparatuses, TOF sensors, TOF modules, processors, memories, storage devices, input devices, output devices, network interfaces, communication busses, and other apparatuses, devices, units, modules, and components described herein with respect to FIGS. 1 through 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, comprising:
   determining a real part image, an imaginary part image, and an offset image based on input images, where the input images are dependent on infrared rays of different phases;
   removing noise from each of the real part image and the imaginary part image using the offset image as a noise removal guide; and
   generating a depth image based on an improved real part image and an improved imaginary part image corresponding to respective results of the removing.

2. The method of claim 1, further comprising sensing the infrared rays and generating the input images using the sensed infrared rays.

3. The method of claim 2, further comprising transmitting the infrared rays,
   wherein the sensing of the infrared rays includes sensing reflections of the transmitted infrared rays, and the generating of the input images uses the sensed reflections of the transmitted infrared rays.

4. The method of claim 1, wherein the determining of the real part image, the imaginary part image, and the offset image comprises:
   determining the real part image based on a difference in a first image pair among the input images;
   determining the imaginary part image based on a difference in a second image pair among the input images different from the first image pair; and
   determining the offset image based on a sum of the input images.

5. The method of claim 1, wherein the removing of the noise comprises:
   determining a weighted sum coefficient of a non-local mean (NLM) filter from the offset image; and
   determining the improved real part image and the improved imaginary part image by calculating a weighted sum for each of the real part image and the imaginary part image based on the weighted sum coefficient.

6. The method of claim 5, wherein the determining of the weighted sum coefficient comprises:
   determining a weight of a central pixel of a first scan patch of the offset image based on a similarity between a first target patch of the offset image and the first scan patch of the offset image; and
   determining a first weighted sum coefficient of the central pixel of the first target patch based on the weight of the central pixel of the first scan patch.

7. The method of claim 1, wherein the generating of the depth image comprises:
- determining a phase image based on the improved real part image and the improved imaginary part image; and
- generating the depth image by performing phase wrapping based on the phase image.

8. The method of claim 1, wherein the removing of the noise comprises:
- generating a temporary filtering result by removing noise from the real part image using the offset image as the noise removal guide;
- determining a residual image corresponding to a difference between the temporary filtering result and the real part image;
- generating an improved residual image by removing noise from the residual image using the offset image as the noise removal guide; and
- determining the improved real part image by adding the temporary filtering result and the improved residual image.

9. The method of claim 1, wherein the removing of the noise comprises:
- performing recursive twicing regularization comprising a plurality of noise removal stages of performing the noise removal based on the offset image.

10. The method of claim 9, wherein, as noise removal on the offset image is gradually performed through the noise removal stages, a different version of the improved offset image is used in each of the noise removal stages.

11. The method of claim 9, wherein the performing of the recursive twicing regularization comprises:
- determining a first improved real part image, a first improved imaginary part image, and a first improved offset image by performing twicing regularization on the real part image, the imaginary part image, and the offset image, respectively, based on the offset image in a first noise removal stage of the noise removal stages; and
- determining a second improved real part image, a second improved imaginary part image, and a second improved offset image by performing twicing regularization on the real part image, the imaginary part image, and the offset image, respectively, based on the improved first offset image in a second noise removal stage of the noise removal stages.

12. The method of claim 11,
- wherein a final improved real part image and a final improved imaginary part image are determined through a final noise removal stage of the noise removal stages, and
- wherein the generating of the depth image comprises generating the depth image based on the final improved real part image and the final improved imaginary part image.

13. A non-transitory computer-readable storage medium storing instructions that, when executed by a processor, configure the processor to perform the method of claim 1.

14. An apparatus, comprising:
a processor configured to:
- determine a real part image, an imaginary part image, and an offset image based on input images, where the input images are dependent on infrared rays of different phases;
- remove noise from each of the real part image and the imaginary part image using the offset image as a noise removal guide; and
- generate a depth image based on an improved real part image and an improved imaginary part image corresponding to respective results of the removing.

15. The apparatus of claim 14, further comprising a sensor configured to sense the infrared rays and generate the input images using the sensed infrared rays.

16. The apparatus of claim 15, wherein the sensor is configured to transmit the infrared rays, sense reflections of the transmitted infrared rays, and generate the input images using the sensed reflections of the transmitted infrared rays.

17. The apparatus of claim 14, wherein the processor is configured to:
- determine the real part image based on a difference in a first image pair among the input images;
- determine the imaginary part image based on a difference in a second image pair among the input images different from the first image pair; and
- determine the offset image based on a sum of the input images.

18. The apparatus of claim 14, wherein the processor is configured to:
- determine a weighted sum coefficient of a non-local mean (NLM) filter from the offset image; and
- determine the improved real part image and the improved imaginary part image by a weighted sum for each of the real part image and the imaginary part image based on the weighted sum coefficient.

19. The apparatus of claim 18, wherein, for the determining of the weighted sum coefficient, the processor is configured to:
- determine a weight of a central pixel of a first scan patch based on a similarity between a first target patch of the offset image and the first scan patch of the offset image; and
- determine a first weighted sum coefficient of the central pixel of the first target patch based on the weight of the central pixel of the first scan patch.

20. The apparatus of claim 14, wherein the processor is configured to:
- perform recursive twicing regularization comprising a plurality of noise removal stages of performing the noise removal based on the offset image.

21. The apparatus of claim 20, wherein, as noise removal on the offset image is gradually performed through the noise removal stages, a different version of the improved offset image is used in each of the noise removal stages.

22. The apparatus of claim 14, further comprising a memory storing instructions, which when executed by the processor, configure the processor to perform the determination of the real part image, the imaginary part image, and the offset image, the removal of the noise from each of the real part image and the imaginary part image, and the generation of the depth image.

23. An electronic apparatus, comprising:
a time-of-flight (TOF) sensor configured to generate input images using infrared rays of different phases; and
a processor configured to:
- determine a real part image, an imaginary part image, and an offset image based on the input images;
- remove noise from each of the real part image and the imaginary part image using the offset image as a noise removal guide; and
- generate a depth image based on an improved real part image and an improved imaginary part image corresponding to respective results of the removing.

24. The apparatus of claim 23, wherein the apparatus is configured to transmit the infrared rays of the different phases.

25. The apparatus of claim 24, wherein, for the transmission of the infrared rays of the different phases, the time-of-flight (TOF) sensor is configured to perform the transmission of the infrared rays of the different phases.

26. The apparatus of claim 23, wherein the processor is configured to:

perform recursive twicing regularization comprising a plurality of noise removal stages of performing the noise removal based on the offset image.

27. The apparatus of claim 26, wherein, as noise removal on the offset image is gradually performed through the noise removal stages, a different version of the improved offset image is used in each of the noise removal stages.

28. An electronic apparatus, comprising:

a sensor configured to capture image data, for plural input images, using infrared rays of different phases; and a processor configured to:
  determine a real part image data and an imaginary part image data based on the captured image data for the plural input images;
  remove noise from each of the real part image data and the imaginary part image data using another image data as a noise removal guide; and
  generate depth image data based on an improved real part image data and an improved imaginary part image data corresponding to respective results of the removing,
wherein the other image data is dependent on image data corresponding to multiple input images among the plural input images.

29. The apparatus of claim 28, wherein the other image data is an average of four of the plural input images, representing an offset image.

30. The apparatus of claim 28, wherein the processor is configured to perform recursive twicing regularization comprising a plurality of noise removal stages of performing the noise removal based on the other image data.

* * * * *